United States Patent [19]
Horiuchi et al.

[11] Patent Number: 4,660,433
[45] Date of Patent: Apr. 28, 1987

[54] MECHANISM FOR PREVENTING ERRONEOUS REVERSE GEAR SHIFTING IN GEAR TRANSMISSIONS

[75] Inventors: Ichiro Horiuchi; Shoich Ohshima; Keiji Takeshita, all of Toyota, Japan

[73] Assignees: Aisin Seiki Kabushiki Kaisha; Toyota Jidosha Kabushiki Kaisha, both of Japan

[21] Appl. No.: 873,124

[22] Filed: Jun. 11, 1986

Related U.S. Application Data

[63] Continuation of Ser. No. 534,981, Sep. 23, 1983, abandoned.

[30] Foreign Application Priority Data

Sep. 30, 1982 [JP] Japan ................................ 57-148168

[51] Int. Cl.$^4$ .............................................. F16H 57/06
[52] U.S. Cl. ................................................ 74/476
[58] Field of Search ........................ 74/476, 475, 477

[56] References Cited

U.S. PATENT DOCUMENTS 3,933,057  1/1976  Tsuzuki .................................. 74/476
3,939,724  2/1976  Takahashi .............................. 74/476
4,018,099  4/1977  O'Brien ................................. 74/476

FOREIGN PATENT DOCUMENTS 2645271   4/1978  Fed. Rep. of Germany ........ 74/476
0031274   3/1977  Japan ..................................... 74/476
0193972  11/1983  Japan ..................................... 74/476
2067687   7/1981  United Kingdom ................. 74/476

Primary Examiner—Carl Stuart Miller
Attorney, Agent, or Firm—Finnegan, Henderson, Farabow, Garrett & Dunner

[57] ABSTRACT

An erroneous gearshifting prevention mechanism includes a sliding lever mounted on a shift lever shaft supported on a case cover attached to a transmission case. The sliding lever has a projection including a slanted surface engageable with a reverse restriction pin rotatably and axially movably disposed in a boss integral with the case cover. When a shift lever mounted on the shift lever shaft is shifted in error from a fifth-speed gear position toward a reverse gear position, the projection is engaged by the reverse restriction pin and prevented from further movement. Any force imposed by the projection on the reverse restriction pin is directed by the slanted surface toward a relatively thick wall portion of the boss. The boss is thus protected against damage or breakage.

1 Claim, 6 Drawing Figures

MECHANISM FOR PREVENTING ERRONEOUS REVERSE GEAR SHIFTING IN GEAR TRANSMISSIONS

This application is a continuation of application Ser. No. 534,981 filed Sept. 23, 1983, now abandoned.

BACKGROUND OF THE INVENTION

The present invention relates to a mechanism for preventing erroneous reverse gearshifting in a gear transmission, and more particularly to such a mechanism including a sliding lever having an improved restriction surface.

Conventional erroneous gearshifting prevention mechanisms in gear transmissions have a sliding lever mounted on a shift lever shaft supported on a case cover attached to a transmission case. The sliding lever has a projection engageable with a reverse restriction pin rotatably and axially movably disposed in a boss integral with the case cover. When a shift lever mounted on the shift lever shaft is shifted erroneously from a fifth-speed gear position toward a reverse gear position, the projection is engaged by the reverse restriction pin and prevented from further movement. Any force imposed by the projection upon the reverse restriction pin is directed toward a relatively thin wall portion of the boss, which tends to be broken or otherwise damaged under repeated stress.

SUMMARY OF THE INVENTION

It is an object of the present invention to provide an erroneous gearshifting prevention mechanism for use in gear transmissions which includes a sliding lever having a projection of an improved shape for preventing a boss, receiving a reverse restriction pin engageable with the projection, from being broken or damaged.

According to the present invention, a projection on a sliding lever mounted on a shift lever shaft has a slanted surface for directing any force, which is applied to a reverse restriction pin by the projection on erroneous shifting movement of a shift lever toward a reverse gear position, in an orientation toward a relatively thick wall portion of a boss receiving the reverse restriction pin, thus protecting the boss from breakage or damage.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
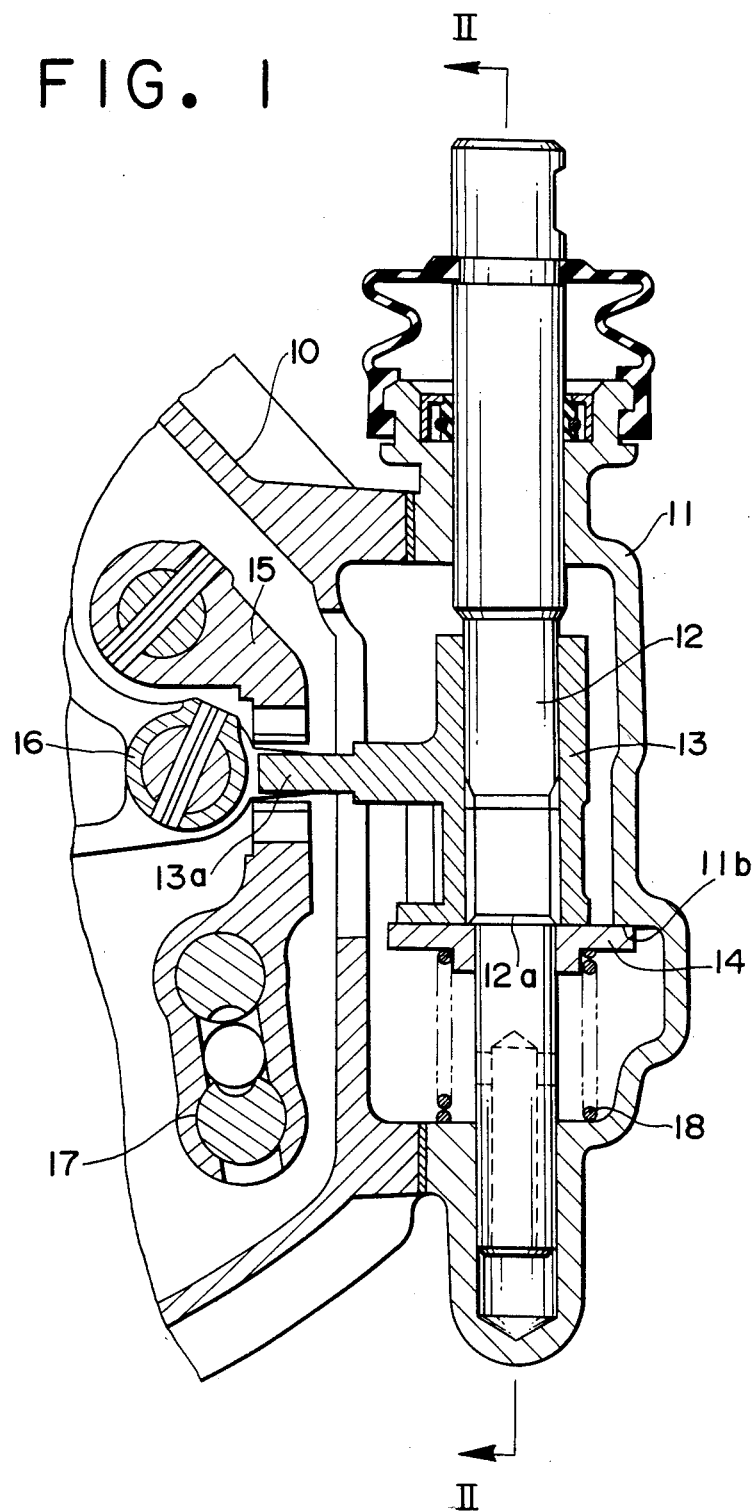
FIG. 1 is a fragmentary longitudinal cross-sectional view of a gear transmission to which the present invention is applicable.
Figure 2:
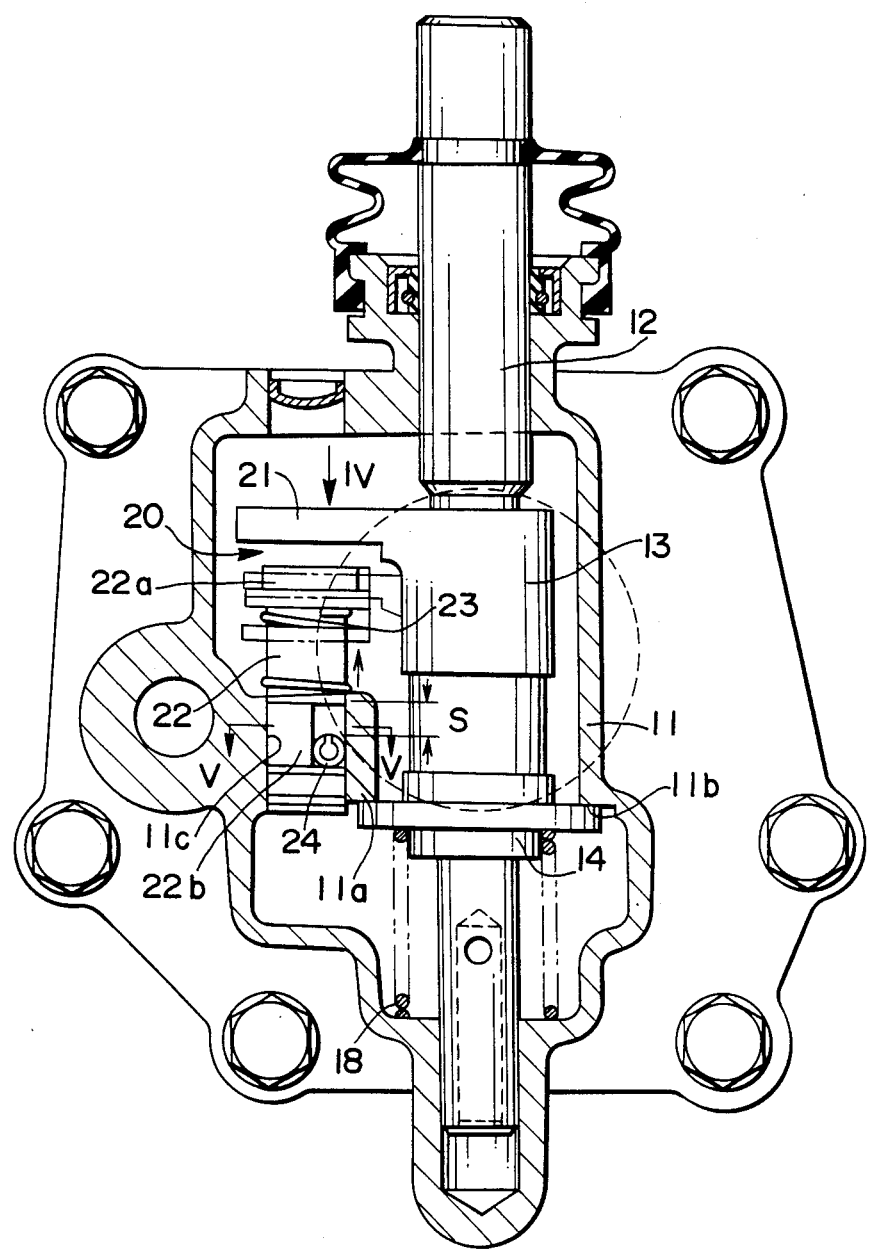
FIG. 2 is a cross-sectional view taken along line II—II of FIG. 1.

FIGS. 1 and 2 illustrate a portion of a remotely controlled gearshifting mechanism in a five-speed gear transmission with a reverse gear. The remotely controlled gearshifting mechanism includes a shift lever shaft 12 rotatably and axially movably mounted on a case cover 11 attached to a transmission case 10. The shift lever shaft 12 can be moved angularly in response to a shifting movement of a shift lever (not shown) and also moved axially in response to a selecting movement of the shift lever. A sliding lever 13 is fitted over the shift lever shaft 12 for movement in unison therewith, a spring seat 14 being detachably held in engagement with the shift lever 12. The sliding lever 13 has an integral lever 13a extending into the transmission case 10 and selectably engageable with three shift heads 15, 16, 17 disposed therein. The spring seat 14 is normally urged upwardly as shown by a spring 18 having a lower end bearing on the case cover 11. The spring seat 14 thus spring-biased is held in engagement with a step 12a of the shift lever shaft 12 and a boss 11a and a step 11b of the case cover 11 to position the shift lever shaft 12 in the illustrated location which corresponds to a neutral position N in FIG. 3. The shift head 15 serves to shift the transmission from a first-speed gear to a second-speed gear, the shift head 16 serves to shift the transmission from a third-speed gear to a fourth-speed gear, and the shift head 17 serves to shift the transmission from a fifth-speed gear to a reverse gear.

Figure 3:
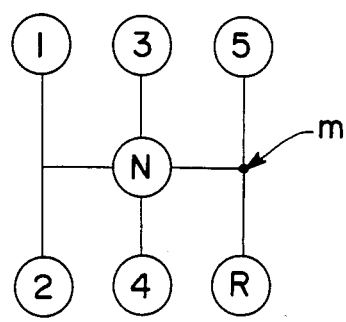
FIG. 3 is a diagram showing a gearshifting pattern for the gear transmission illustrated in FIGS. 1 and 2.
Figure 4:
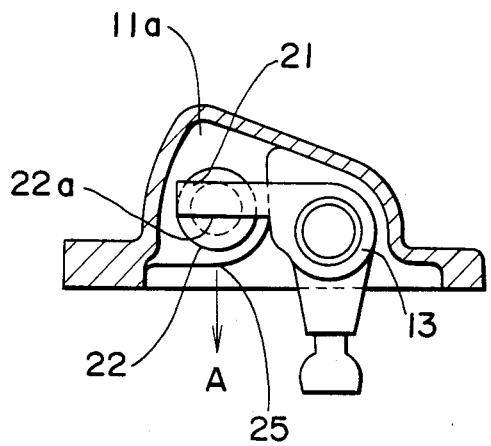
FIG. 4 is a plan view, partly in cross section, as viewed in the direction of the arrow IV of FIG. 2.
Figure 5:
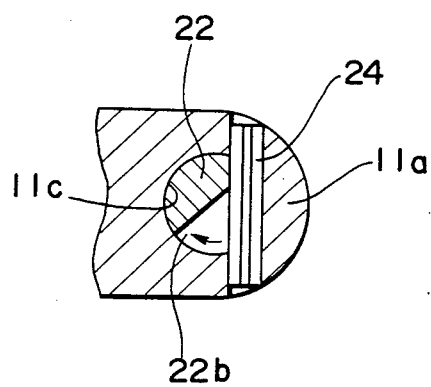
FIG. 5 is an enlarged cross-sectional view taken along line V—V of FIG. 2.

As illustrated in FIG. 2, the case cover 11 houses therein an erroneous gearshifting prevention device 20 for preventing the shift lever in the fifth-speed gear position from being shifted directly into the reverse position beyond an intermediate position m shown in FIG. 3. The erroneous gearshifting prevention device 20 comprises a projection 21 integral with the sliding lever 13, a reverse restriction pin 22 and a coil spring 23 assembled on the boss 11a of the case cover 11, and a slotted pin 24 extending in and across the boss 11a for positioning the reverse restriction pin 22 as illustrated. The projection 21 is positioned with respect to the reverse restriction pin 22 as shown in FIG. 2 when the shift lever is in the neutral position N in FIG. 3. The reverse restriction pin 22 is rotatably and axially slidably disposed in an attachment hole 11c defined in the boss 11a and has a distal end confronting the projection 21. The distal end of the reverse restriction pin 22 has a recess 22a as shown in FIGS. 2 and 4. When the projection 21 engages the recess 22a, the projection 21 is prevented by the recess 22a from being angularly moved. The reverse retriction pin 22 also has a central slot 22b as illustrated in FIGS. 2 and 5. The coil spring 23 has one end engaging the boss 11a and an opposite end engaging the distal end of the reverse restriction pin 22. The coil spring 23 thus normally biases the reverse restriction pin 22 to move the pin axially in the direction of the arrow shown in FIG. 2 and also to turn the pin in the direction of the arrow shown in FIG. 5. The slotted pin 24 extends through the slot 22b in the reverse restriction pin 22 and is engageable with the latter to thereby prevent the same from turning clockwise as shown in FIG. 5 while permitting the reverse restriction pin 22 to move axially for an interval S illustrated in FIG. 2. The interval S is slightly greater than the distance that the reverse restriction pin 22 traverses by being pushed in by the projection 21 when the shift lever is shifted from the neutral position N to the intermediate position m in FIG. 3.

When the shift lever is to be shifted between the first-speed through fourth-speed gear positions in the speedshifting pattern shown in FIG. 3, the projection 21 of the sliding lever 13 is kept out of contact with the reverse restriction pin 22, and the erroneous speedshifting prevension device 20 remains inoperative. Therefore, the shift lever can be freely manipulated among such speed positions.

When the shift lever is shifted from the neutral position N to the intermediate position m between the fifth-speed and reverse gear positions as illustrated in FIG. 3, the shift lever shaft 12 and the sliding lever 13 are pushed downwardly as shown in FIG. 2 against the force of the spring 18 until the projection 21 is held against the distal end of the reverse restriction pin 22, which is then pushed into the imaginary-line position illustrated in FIG. 2. As the shift lever is shifted from this position to the fifth-speed gear position, the projection 21 is disengaged from the distal end of the reverse restriction pin 22, which then returns to the original position under the action of the coil spring 23. When the shift lever is actuated to be shifted from the fifth-speed gear position to the reverse gear position, the projection 21 abuts against an edge of the recess 22a in the reverse restriction pin 22 before the shift lever reaches the intermediate position m, thus causing the reverse restriction pin 22 to turn counterclockwise (FIG. 4). As the shift lever slightly surpasses the intermediate position m, the projection 21 is fully received in the recess 22a as illustrated in FIG. 4, whereupon the reverse restriction pin 22 is prevented from turning about its own axis. The projection 21 is now limited in movement by the reverse restriction pin 22 to prevent the shift lever from being shifted erroneously into the reverse position.

At this time, any force imposed by the projection 21 on the reverse restriction pin 22 is oriented in the direction of the arrow A as shown in FIG. 4. The boss 11a receiving the reverse restriction pin 22 has a relatively thin wall portion 25 which is subject to such force and is in danger of being broken thereby.

To avoid this problem, the wall of the boss 11a may be of an increased thickness or the reverse restriction pin 22 may be located in a different position to provide the boss wall with a larger thickness. However, the former proposal would make the overall erroneous gearshifting prevention device heavier, and the latter modification would result in a change in the position of attachment of the sliding lever, rendering the transmission case larger in size.

Figure 6:
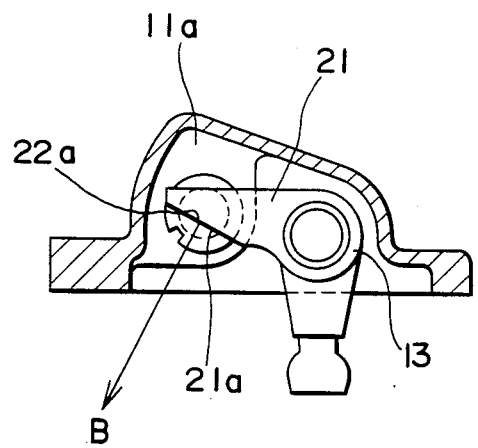
FIG. 6 is a plan view similar to FIG. 4, showing a mechanism according to the present invention.

According to the present invention, an erroneous gearshifting prevention device as shown in FIG. 6 can be incorporated in the gearshifting mechanism of the foregoing construction. The erroneous gearshifting prevention device comprises a sliding lever 13 having a projection 21 including a slant restriction surface 21a. When the shift lever is shifted erroneously from the fifth-speed gear position into the reverse gear position, the slant restriction surface 21a of the projection 21 is brought into engagement with the confronting surface of the recess 22a. Any force which is applied by the projection 21 and, hence, the reverse restriction pin 22, to the boss 11a acts in the direction of the arrow B on a relatively thick wall of the boss 11a rather than on the thin wall portion 25 (FIG. 4). Therefore, the boss 11a is protected from the danger of breakage or other damage by the force applied by the projection 21 in an erroneous gearshifting operation from the fifth-speed gear to the reverse gear.

Although a certain preferred embodiment has been shown and described, it should be understood that many changes and modifications may be made therein without departing from the scope of the appended claim.

What is claimed is:

1. A gear transmission comprising:
   (a) a shift lever movable between a forward-gear position and a reverse-gear position along a straight line with an intermediate position therebetween;
   (b) a transmission case;
   (c) a case cover attached to said transmission case;
   (d) a shift lever shaft rotatably and axially movable on said case cover, said shift lever shaft being connected to said shift lever;
   (e) a boss having a thick portion fixed to the inside surface of a wall of said case cover and a thinner portion extending inwardly towards said shift lever shaft; and
   (f) an erroneous gear shifting prevention device including a sliding lever mounted on said shift lever shaft and rotatable in response to shifting movement of said shift lever and axially movable in response to selecting movement of said shift lever, said sliding lever having an integral projection including a slanted restriction surface, and a reverse restriction pin rotatably and axially movably disposed in said boss in confronting relation to said projection and having a recess, the arrangement being such that when said shift lever is shifted in error from said forward gear position toward said reverse-gear position across said intermediate position, said slanted restriction surface engages said recess to be prevented from undergoing further movement, and acts on said reverse restriction pin in an outward direction toward said thick portion of said boss.

* * * * *